(12) United States Patent
Noro et al.

(10) Patent No.: US 6,213,249 B1
(45) Date of Patent: Apr. 10, 2001

(54) ELECTRIC POWER STEERING APPARATUS

(75) Inventors: Yoshiki Noro; Yoshinobu Mukai, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/124,936

(22) Filed: Jul. 30, 1998

(30) Foreign Application Priority Data

Aug. 18, 1997 (JP) .................................................. 9-221536

(51) Int. Cl.[7] ........................................................ B62D 5/06
(52) U.S. Cl. ............................ 180/446; 180/407; 701/43
(58) Field of Search ..................................... 180/443, 446, 180/404, 405, 406, 407; 701/41, 42, 43

(56) References Cited

U.S. PATENT DOCUMENTS

| | | | |
|---|---|---|---|
| 4,702,334 | * 10/1987 | Takeshima et al. | 180/142 |
| 4,869,334 | * 9/1989 | Marumoto et al. | 180/79.1 |
| 5,097,420 | * 3/1992 | Morishita | 180/79.1 |
| 5,259,473 | * 11/1993 | Nishimoto | 180/79.1 |
| 5,339,243 | * 8/1994 | Matsuoka et al. | 180/79.1 |
| 5,809,438 | * 9/1998 | Noro et al. | 701/41 |

* cited by examiner

*Primary Examiner*—Brian L. Johnson
*Assistant Examiner*—Avraham H. Lerner
(74) *Attorney, Agent, or Firm*—Merchant & Gould P.C.

(57) ABSTRACT

An electric power steering apparatus for a vehicle includes a fail-safe circuit for, on the basis of an engine running-state signal from an engine running-state sensor, enabling an electric motor to be driven by a motor drive unit so that a steering assist force from the electric motor is applied to the steering system of a vehicle. The fail-safe circuit, when the vehicle velocity detected by a vehicle velocity sensor is above a predetermined value, enables the electric motor to be driven by the motor drive unit even if the engine running-state sensor fails to detect the running state of the engine. Thus, even when a failure arises in the engine running-state sensor during movement of the vehicle, the motor can continue application of the steering assist force to the steering system. The electric power steering apparatus can always provide a good and stable steering feel as long as the vehicle is running even though the running state of the engine is not detected.

5 Claims, 4 Drawing Sheets

ELECTRIC POWER STEERING APPARATUS

BACKGROUND OF THE INVENTION

1. Field of the Invention

The present invention relates to improvements in an electric power steering apparatus which provides power of an electric motor to the steering system of a vehicle to thereby reduce the manual steering effort or force needed to turn the steering wheel.

2. Description of the Related Art

Automotive electric power steering apparatuses having an engine running-state sensor, such as an engine speed (rpm: revolutions per minute) sensor or an alternator, for detecting running of an automotive engine are known. The term "running" is used herein to refer to a condition or state in which the engine is in active or operation. When the engine runningstate sensor detects running of the engine, a power supply voltage from a battery is supplied to a bridge circuit (motor drive circuit) consisting of a plurality of switching elements such as power field-effect transistors (FETs), to thereby activate the motor drive circuit for driving the electric motor to provide the output power (steering assist) of the electric motor to the steering system of a motor vehicle.

In the conventional electric power steering apparatuses, the electric motor is kept inoperative until after running of the engine is detected. Accordingly, when a failure arises in the engine running-state sensor, the electric motor cannot be started even though the engine is running to drive the vehicle. Since there is no power assist available from the electric motor, a great muscular effort or force should be exerted by the driver to turn the steering wheel. Such steering operation is contrary to the driver's anticipative power-assisted steering operation and hence disconcerts the driver. As a result, the steering operation is performed unnaturally and a good steering feel cannot not be obtained.

One solution for the foregoing problems may include an arrangement in which start of operation of the electric motor is independent from the detection of running of the electric motor. This arrangement, however, has another problem that if the steering wheel is turned repeatedly during stop of the engine with the ignition switch kept in the ON state, the battery will become discharged in a relatively short period of use because the battery power is consumed by the electric motor without being recharged by the alternator which is connected in driven relation to the engine.

SUMMARY OF THE INVENTION

With the foregoing drawbacks in view, it is an object of the present invention to provide an electric power steering apparatus for a vehicle, which when the vehicle is running, can start operation of an electric motor to apply a steering assist force to a steering system of the vehicle even if detection of running of an engine becomes impossible due to a failure in an engine running-state sensor, such as an engine speed sensor or an alternator.

According to the present invention, there is provided an electric power steering apparatus for a vehicle, comprising: a vehicle velocity sensor for detecting a velocity of the vehicle and generating a vehicle velocity signal corresponding to the detected vehicle velocity; an electric motor for applying a steering assist force to a steering system of the vehicle; a control unit for generating a motor control signal on the basis of at least a steering torque applied to the steering system; a motor drive unit for driving the electric motor on the basis of the motor control signal; an engine running-state sensor for detecting a running state of an engine of the vehicle and generating an engine running-state signal corresponding to the detected running state of the engine; and a fail-safe circuit for, on the basis of the engine running-state signal from the engine running-state sensor, enabling the electric motor to be driven by said motor drive unit. The fail-safe circuit, when the vehicle velocity detected by the vehicle velocity sensor is above a predetermined value, also enables the electric motor to be driven by the motor drive unit even if the engine running-state sensor fails to detect the running state of the engine.

With the fail-safe circuit thus arranged, the electric power steering apparatus can apply the steering assist force to the steering system even when detection of the running state of the engine becomes impossible due to a failure in the engine running-state sensor.

The fail-safe circuit preferably includes an engine running-state comparator for comparing the engine running-state signal and a first predetermined value, a vehicle velocity comparator for comparing the vehicle velocity signal and a second predetermined value, an OR logic operator for performing a logic sum of the result of comparison made by the engine running-state comparator and the result of comparison made by the vehicle velocity comparator, and a switching unit for, on the basis a logic signal output from the OR logic operator, enabling the electric motor to be driven by the motor drive unit.

Even if the engine running-state signal is below the first predetermined value, the vehicle is regarded as being in the running state when the vehicle velocity signal is above the second predetermined value with the result that operation of the motor is continued to thereby enable the motor to apply the steering assist force to the steering system.

The switching unit preferably includes a relay circuit having a normally-open contact relay. When at least one of the engine running-state signal and the vehicle velocity signal is above the corresponding predetermined value, the normally-open contact relay is activated or switched on to thereby enable the electric motor to be driven by the motor drive unit.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

Certain preferred embodiments of the present invention will be described in greater detail with reference to the accompanying drawings.

Figure 1:
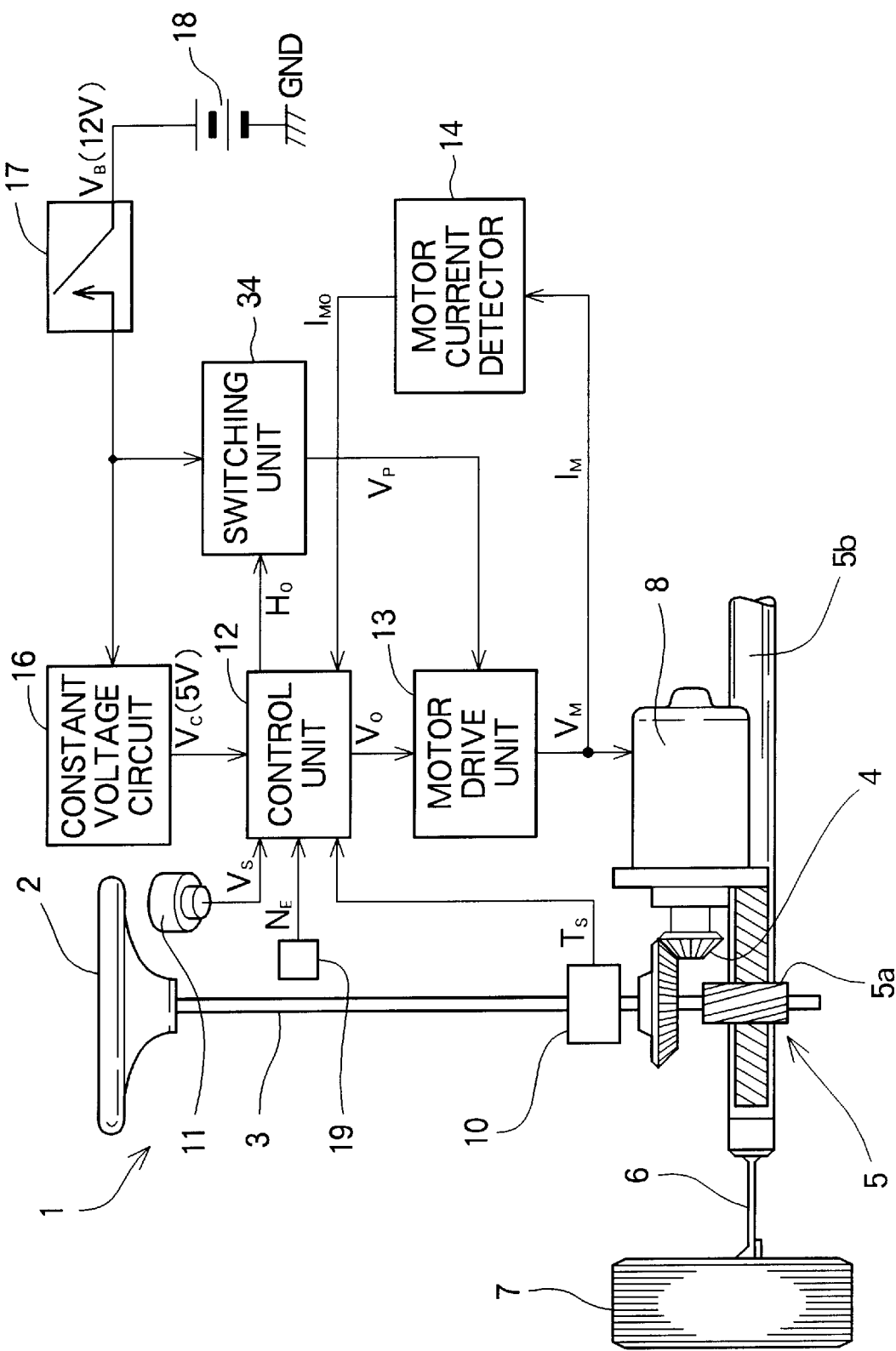
FIG. 1 is a diagrammatical view showing the general construction of an electric power steering apparatus according to a first embodiment of the present invention.

Referring now to FIG. 1, there is shown the general construction of an electric power steering apparatus for a vehicle according to a first embodiment of the present invention. The electric power steering apparatus 1 generally comprises a steering wheel 2, a steering column or shaft 3 connected at its upper end to a central portion of the steering wheel 2, a hypoid gear set 4 assembled with a lower end portion of the steering shaft 3, a rack-and-pinion mechanism 5 composed of a pinion 5a provided at the lower end of the steering shaft 3 and a rack shaft 5b having a rack of gear teeth (not designated) meshing with the pinion 5a, a tie rod 6 connected to each end of the rack shaft 5b, a steerable front wheel 7 connected to the rack shaft 5b via the tie rod 6, and an electric motor 8 for generating a steering assist force or torque. The components 2, 3, 5, 6 and 7 jointly form a steering system of the vehicle. The steering assist torque generated by the electric motor 8 is applied to the steering system via the hypoid gear set 4.

The electric power steering system 1 further includes a steering torque sensor 10 for detecting a steering torque acting in the steering system when the steering wheel 2 is turned and generating a steering torque signal $T_S$ in terms of an electric signal corresponding to the detected steering torque, a control means or unit 12 for, on the basis of the steering torque signal $T_S$, setting a target current signal $I_{MS}$ needed to drive the electric motor 8 and generating a motor control signal $V_O$ corresponding to the target current signal $I_{MS}$, a motor drive means or unit 13 for PWM (pulse-width modulation) controlling the electric motor 8 by using a motor voltage $V_M$ determined on the basis of the motor control signal $V_O$, and a motor current detecting means or sensor 14 for detecting a motor current $I_M$ when the electric motor 8 is rotating in a forward or a reverse rotation and generating a motor current detection signal $I_{MO}$ corresponding to the detected motor current $I_M$.

Additionally, the electric power steering apparatus 1 includes an engine running-state sensor 19 for detecting running of an engine of the vehicle. In the illustrated embodiment, the engine running-state sensor 19 is comprised of an engine speed (rpm) sensor for detecting a speed (rpm) of the engine and generating an engine speed signal $N_E$ in terms of an electric signal corresponding to the detected engine speed, and a vehicle velocity sensor 11 for detecting a velocity of the vehicle and generating a vehicle velocity single $V_S$ in terms of an electric signal corresponding to the detected vehicle velocity. The control unit 12, when it judges the vehicle to be in the running state on the basis of the engine speed signal $N_E$ or the vehicle velocity single $V_S$, outputs a logic signal $H_0$ to enable or activate a switching means or unit 34 so that a power supply voltage $V_B$ (12V) from a battery 18 is supplied via the switching unit 34 to the motor drive unit 13 to thereby activate or drive the motor drive unit 13 to start operation of the electric motor 8.

An ignition switch 17 is turned on when the vehicle is to be started. When the ignition switch 17 is turned on, the power supply voltage $V_B$ (12V) from the battery 18 is supplied to a switch means or unit 34 and a constant voltage circuit 16. The constant voltage circuit 16 steps down the power supply voltage $V_B$ (12V) and generates a constant voltage $V_C$ (5V) for driving the control unit 12 and the motor current sensor 14. Thus, when the ignition switch 17 is switched on by the driver, a constant voltage $V_C$ (5V) is supplied from the constant voltage circuit 16 to the control unit 12 and thereby activates the control unit 12.

When the steering wheel 2 is turned by the driver, the steering torque sensor 10 associated with the steering shaft 3 detects a steering torque applied to the steering shaft 3 and supplies a steering torque signal $T_S$ corresponding to the detected steering torque to the control unit 12. The steering torque applied to the steering shaft 3 rotates the pinion 5a. Rotation of the pinion 5a is translated by the rack-and-pinion mechanism 5 into an axial reciprocating movement of the rack shaft 5b which in turn is transmitted via the tie rods 6 to the front wheels 7 (only one being shown) to thereby pivot the front wheels 7.

In this condition, when the engine is started, the engine speed sensor 19 generates an engine speed signal $N_E$ corresponding to a speed (rpm) of the engine and supplies this engine speed signal $N_E$ to the control unit 12. Upon receipt of the engine speed signal $N_E$, the control unit 12 judges the engine to be in the running state and thus supplies a logic signal $H_0$ to the switching unit 34 to thereby activate the switching unit 34 so that the power supply voltage $V_B$ (12V) of the battery 18 is supplied to the motor drive unit 13.

At the same time, the vehicle velocity sensor 11 supplies a vehicle velocity signal $V_S$ to the control unit 12 whereupon the control unit 12 judges the vehicle to be in the running state with its engine operating continuously. Thus, the control unit 12 supplies a logic signal $H_0$ to the switching unit 34 to thereby activate the switching unit 34 with the result that the power supply voltage $V_B$ (12V) from the battery 18 is supplied to the motor drive unit 13.

Accordingly, when the vehicle velocity signal $V_s$ is supplied from the vehicle velocity sensor 11, the vehicle is regarded as being in the running state and operation of the electric motor 8 is started or continued even if no detection signal (engine speed signal $N_E$) is supplied from the engine speed sensor 19.

Thus, the control unit 12 is designed to activate or switch on the switching unit 34 on the basis of the engine speed signal $N_E$ or the vehicle velocity signal $V_S$ so that the power supply voltage $V_B$ (12V) from the battery 18 is supplied via the switching unit 34 to the motor drive unit 13. More specifically, when the vehicle velocity signal $V_S$ represents a vehicle velocity above a predetermined value, the vehicle is regarded as being in the running state with its engine operating continuously and the power supply voltage $V_B$ (12V) from the battery 18 is supplied through the switching unit 34 to the motor drive unit 13 to thereby start operation of the electric motor 8 to apply a steering assist force to the steering system even if the engine speed cannot be detected due to a failure in the engine speed sensor 19 (namely, there is no engine speed signal $N_E$ supplied from the engine speed sensor 19).

The motor drive unit 13 comprises a bridge circuit (not shown) consisting of four switching elements such as power FETs or insulated-gate bipolar transistors. The motor drive unit 13 generates a motor voltage $V_M$ corresponding to the motor control signal $V_O$ (PWM signal) supplied from the control unit 12, so as to drive the electric motor 8 in the forward or the reverse direction. A motor current $I_M$ thus caused to flow in the electric motor 8 has an intensity and a direction corresponding to an absolute value and a direction of the steering torque T, respectively. A motor torque generated by the electric motor 8 is translated into a steering assist force or torque as it is multiplication by the hypoid gear set 4, and the steering assist torque is applied to the steering shaft 3.

The motor current sensor 14 is a component that uses a resistance or a Hall element to convert the motor current $I_M$ flowing actually in the electric motor 8 into a voltage and reconverts the thus obtained voltage into a corresponding motor current detection signal $I_{MO}$. The motor current detection signal $I_{MO}$ is fed back to the control unit 12 for negative feedback control of the target current signal $I_{MS}$.

The control unit 12 controls such that an offset $\Delta I$ between the target current signal $I_{MS}$ and the motor current detection signal $I_{MO}$ renders zero (0) promptly to thereby make the motor current $I_M$ in exact correspondence to the target current signal $I_{MS}$.

Figure 2:
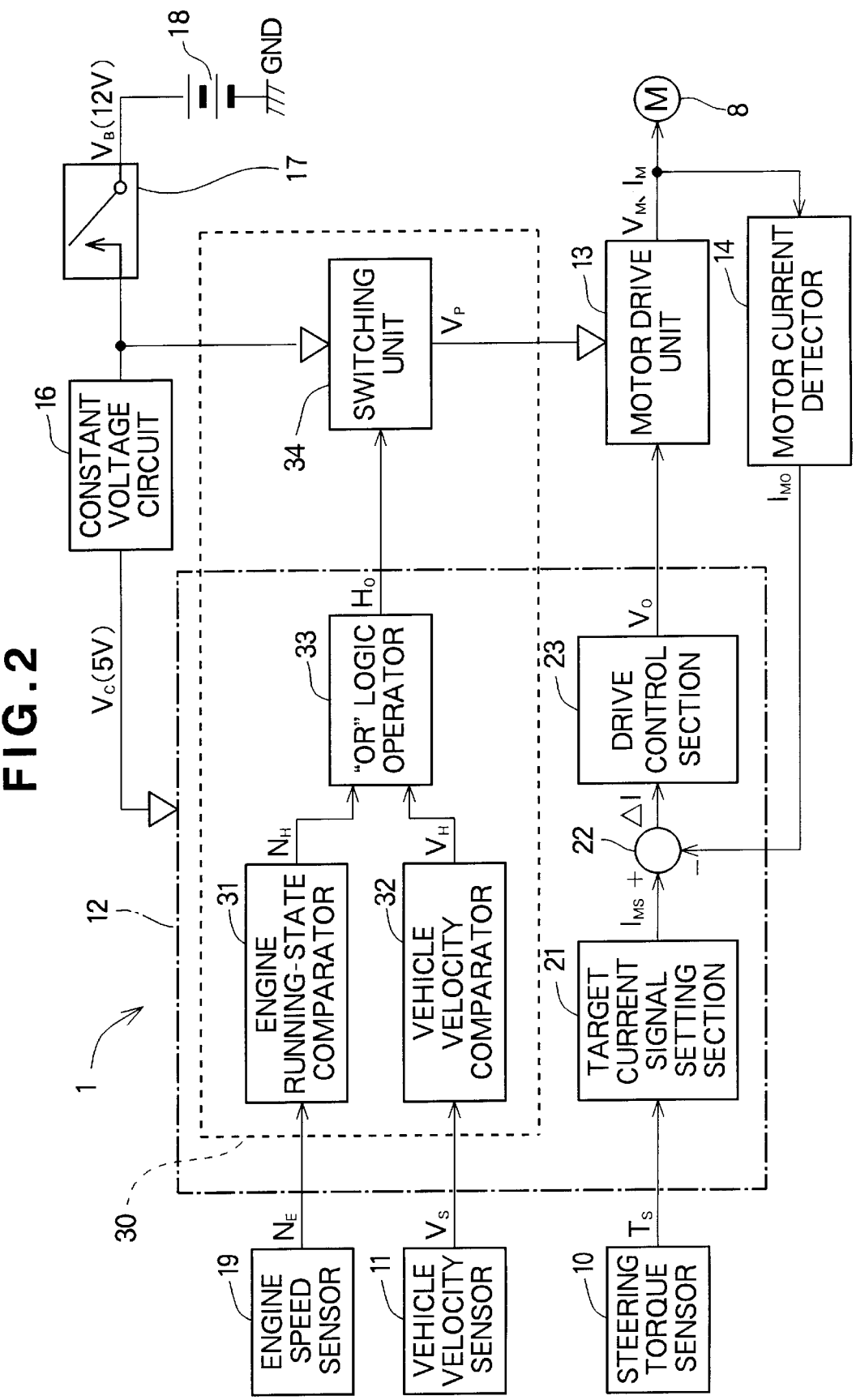
FIG. 2 is a block diagram showing a main portion of the electric power steering apparatus.

Reference is made to FIG. 2 which shows in block diagram a main portion of the electric power steering apparatus 1.

The control unit 12 is a microprocessor-based electronic control unit including various arithmetic and logic units, processors and memories (none of them being shown). As shown in FIG. 2, this unit 12 includes a target current signal setting means or section 21, an offset calculating means or section 22, and a drive control means or section 23.

The target current signal setting section 21 includes a memory such as a ROM (not shown) which stores on a permanent base a table of correlated data collected either theoretically or experimentally in advance about the target current signal $I_{MS}$ and the steering torque signal $T_S$. When supplied with a steering torque signal $T_S$ from the steering torque sensor 10, the target current signal setting part 21 retrieves, from the correlative data table stored in the ROM, a piece of target current signal data ($I_{MS}$) corresponding to the supplied steering torque signal and outputs the retrieved data piece to the offset calculating section 22 as a target current signal $I_{MS}$.

The offset calculating section 22 comprises a subtractor or a software-controlled subtracting function (neither shown). This section 22 calculates an offset or difference $\Delta I$ between the target current signal $I_{MS}$ supplied from the target current signal setting section 21 and the motor current $I_M$ detected by the motor current sensor 14 and supplies an offset signal (corresponding to the calculated offset) $\Delta I$ to the drive control section 23.

The drive control section 23 includes a PID controller, a PWM signal generator and so on (none of them being shown). In this section 23, PID (proportional and integral and derivative) control is carried out for the offset signal $\Delta I$ to generate a composite signal on the basis of the respective outputs from the proportional, integral and derivative control actions. In order to control the direction and magnitude of a torque to be generated from the electric motor 8 on the basis of the composite signal, the drive control section 23 generates a motor control signal $V_0$ consisting of a combination of an ON signal $V_{ON}$ and a PWM control signal $V_{PWM}$ and supplies this motor control signal $V_0$ to the motor drive unit 13.

The motor drive unit 13, composed of a bridge circuit consisting of four switching elements as described above, is controllably driven or activated by the motor control signal $V_0$ and generates a motor voltage $V_M$ having a driving direction and an intensity. The motor voltage $V_M$ is supplied to the electric motor 8 to drive the same with a motor current $I_M$ supplied therewith.

As a power source $V_P$ used for generating the motor voltage $V_M$, the power supply voltage $V_B$ (12V) from the battery is supplied through the switching unit 34 to the motor drive unit 13.

The electric motor 8 is a dc motor or a brush-less motor, and when it is driven by the PWM-controlled motor voltage $V_M$ of a direction and an intensity supplied from the motor drive unit 13, the electric motor 8 generates a power proportional to the electric motor current $I_M$. The output power of the electric motor 8 is applied to the steering system as a steering assist force or torque.

The motor current sensor 14, comprised of a current sensor using a Hall element or a sensor using a resistance to detect current as voltage, detects a motor current $I_M$ flowing in the electric motor 8 and negatively feeds back the detected motor current $I_M$ to the offset calculating section 22 as a motor current detection signal $I_{MO}$.

The control unit 12 further includes a running-state comparing means or comparator 31, a vehicle velocity comparing means or comparator 32, and an "OR" logic operating means or operator 33. The running-state comparator 31, the vehicle velocity comparator 32, the OR logic operator 33 and the above-mentioned switching unit 34 jointly constitute a fail-safe means or circuit 30.

The fail-safe circuit 30 operates such that when an engine speed signal $N_E$ indicative of an engine speed above a predetermined value (such as 500 rpm) is supplied from the engine speed sensor 19, or when a vehicle velocity signal $V_S$ indicative of a vehicle velocity above a predetermined value (such as 10 km/h) is supplied from the vehicle speed sensor 11, the switching unit 34 is activated or switched on to permit the power source $V_P$ (battery power source=12V) to be supplied to the motor drive unit 13, thereby enabling the motor drive unit 13 to start rotation of the electric motor 8.

Additionally, even if supply of an engine speed signal $N_E$ corresponding to an engine speed above the predetermined value is stopped due to a failure in the engine speed sensor 19 during movement of the vehicle, the fail-safe circuit 30 can keep the switching unit 34 in the activated state as long as a vehicle velocity signal $V_S$ corresponding to a vehicle velocity above the predetermined value (10 km/h) is present, so that rotation of the electric motor 8 is continued via the motor drive unit 13.

The running-state comparator 31 includes a comparator or a software-controlled comparing function. This comparator 31 compares the engine speed signal $N_E$ supplied from the engine speed sensor 19 and a preset reference engine speed $N_K$ (500 rpm as specified above) and provides a high (H) level running-state comparison signal (logical one signal) $N_H$ to the OR logic operator 33 when $N_E \geq N_K$ and a low (L) level running-state comparison signal (logical zero signal) $N_H$ when $N_E < N_K$.

Similarly, the vehicle velocity comparator 32 includes a comparator or a software-controlled comparing function. This comparator 32 compares the vehicle velocity signal $V_S$ supplied from the vehicle velocity sensor 11 with a preset reference vehicle velocity $V_K$ (10 km/h as specified above) and provides a high (H) level vehicle velocity comparison signal (logical one signal) $V_H$ to the OR logic operator 33 when $V_S \geq V_K$ and a low (L) level vehicle velocity comparison signal (logical zero signal) $V_H$ when $V_S < V_K$.

The OR logic operator 33 includes an OR circuit or a software-controlled logical inclusive OR function. The OR logic operator 33 performs a logical OR operation on the running-state comparison signal $N_H$ and the vehicle velocity comparison signal $V_H$ and supplies a logic signal $H_0$ to the switching unit 34. When at least one of the running-state comparison signal $N_H$ and the vehicle velocity comparison signal $V_H$ is at the high (H) level (logical one), the OR logic operator 33 supplies a high (H) level logic signal (logical one signal) $H_0$ to thereby pass a judgement that the vehicle is in the running state with the engine operating continuously.

The switching unit 34 comprises a relay circuit including a relay having a normally open contact pair. By the high level logic signal $H_0$ which is supplied from the OR logic operator 33 when at least one of the running-state comparison signal $N_H$ and the vehicle velocity comparison signal $V_H$ is at the high (H) level, the switching unit 34 is activated to close the normally open contact pair, thereby making a circuit to start or continue supply of the power supply voltage $V_B$ (=12V) from the battery 18 to the motor drive unit 13.

Thus, the fail-safe circuit 30 composed of the running-state comparator 31, the vehicle velocity comparator 32, the OR logic operator 33 and the switching unit 34 is constructed to perform a comparison between the engine speed signal $N_E$ supplied from the engine speed sensor 19 and a predetermined value $N_K$ and a comparison between vehicle velocity signal $V_S$ and a predetermined value $V_K$, and to activate the switching unit 34 by means of a logic signal $H_0$ resulting from inclusive OR operation taken on the running-state comparison signal $N_H$ and the vehicle velocity comparison signal $V_H$. Accordingly, when a failure, such as a break in the circuit, arises in the engine speed sensor 19 during movement of the vehicle, supply of the engine speed signal $N_E$ from the engine speed sensor 19 is stopped. In this instance, however, if there is a vehicle velocity signal $V_S$ corresponding to a vehicle velocity above the predetermined value $V_K$, it is judged that the engine is in the running state and, on the basis of this judgment, the switching unit 34 is kept in the activated or ON state, thereby continuing supply of the power source $V_P$ to the motor drive unit 13 to keep the electric motor in a drivable condition.

Although in the illustrated embodiment, the engine running-state detecting means or sensor is an engine speed (rpm) sensor, it may be in the form of an alternator (not shown) which generates an ac power to charge the battery while the engine is running. The alternator detects running of the engine when it generates a voltage above a predetermined level.

Figure 3:
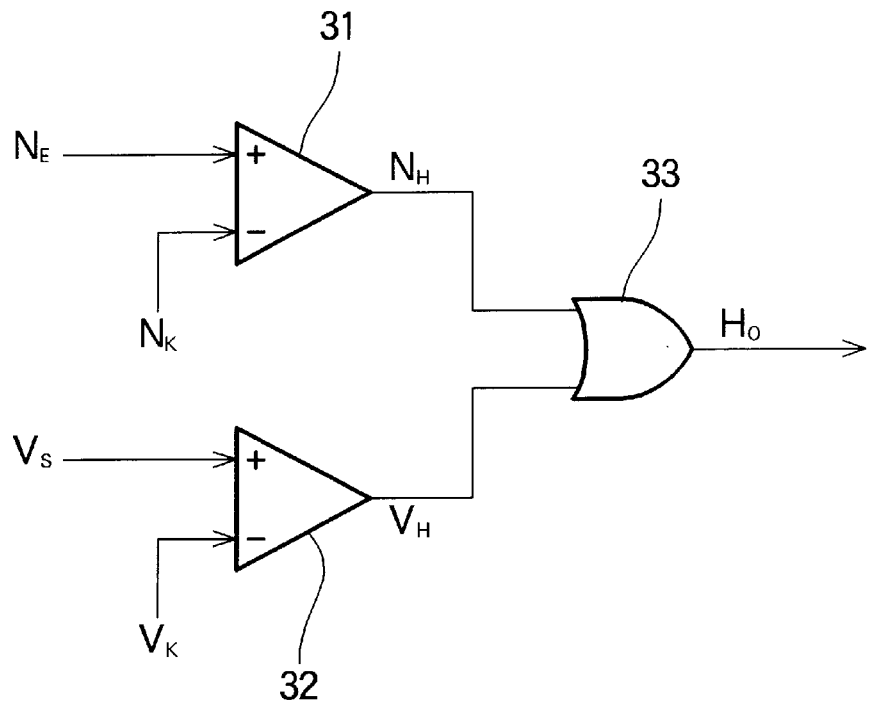
FIG. 3 is a circuit diagram showing a main portion of a fail-safe unit of the electric power steering apparatus.

FIG. 3 shows a preferred form of the running-state comparator 31, the vehicle velocity comparator 32 and the OR logic operator 33 that form part of the fail-safe circuit 30. In this figure, the comparators 31, 32 and the OR logic operator 33 are illustrated as being operational amplifiers, and an OR gate, respectively.

Figure 4:
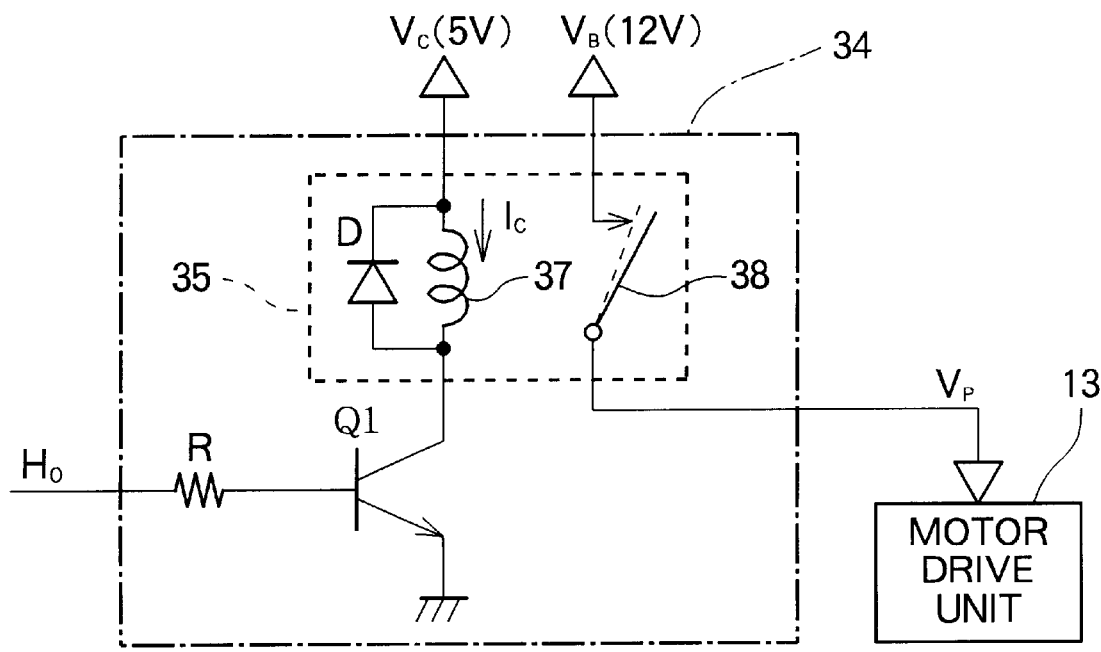
FIG. 4 is a circuit diagram showing a switching means of the fail-safe unit.

Reference is made to FIG. 4 which shows in circuit diagram the switching unit 34 previously described. As shown in this figure, the switching unit 34 is comprised of a relay circuit 35 and a relay drive circuit which is composed of a resistance R and a transistor Q1. The relay circuit 35 includes a relay coil 37 and a normally open relay contact 38. Thus, the relay circuit 35 consists of a normally open contact relay. One end of the relay coil 37 is connected to the constant voltage source $V_C$ (5V). One end of the relay contact 38 is connected to the power source $V_E$ (12V) of the battery 18.

The relay contact 38 is a normally open contact. Accordingly, when the relay coil 37 is not energized (i.e., there is no current $I_C$ flowing in the relay coil 37), the relay contact 38 is kept in its open position (indicated by the solid line) to thereby disconnect the motor drive unit 13 and the power source $V_E$ (12V). Thus, the power source $V_P$ (equal to $V_E$=12V) is not supplied to the motor drive unit 13. Alternately, when the relay coil 37 is energized, the relay contact 38 moves from the open position to a closed position (indicated by the broken line) to thereby turn on or activate the relay (relay circuit) 35, allowing the power source $V_P$ (equal to $V_E$=12V) to be supplied to the motor drive unit 13.

With the relay circuit 35 thus arranged, when a high (H) level logic signal $H_0$ from the OR logic operator 33 is supplied through the resistance R to the transistor Q1, the transistor Q1 conducts or turns on, causing a coil current $I_C$ to flow through the relay coil 37 to thereby close the relay contact 38. Thus, the power source $V_P$ (equal to $V_E$=12V) is supplied through the relay (relay circuit) 35 to the motor drive unit 13. Conversely, when the logic signal $H_0$ supplied to the relay drive circuit is at the low (L) level, the transistor Q1 does not conduct. The relay coil 37 is, therefore, kept de-energized to keep the relay contact 38 in the open position. Accordingly, the power source $V_P$ (equal to $V_E$=12V) is not supplied through the relay (relay circuit) 35 to the motor drive unit 13.

In sum, when a high (H) level logic signal $H_0$ is supplied to the switching unit 34 on the basis of a running-state comparison signal $N_H$ of a higher level than the predetermined level and/or a vehicle velocity comparison signal $V_H$ of a higher level than the predetermined level, the relay circuit 35 is switched on or activated to permit the power source $V_P$ to be supplied to the motor drive unit 13, thereby enabling the motor drive unit 13 to drive the electric motor 8.

Even if detection of an engine speed higher than the predetermined value becomes impossible due to a failure in the engine speed sensor 19 caused during movement of the vehicle, supply of the high (H) level logic signal $H_0$ to the switching unit 34 is continued as long as a vehicle velocity above the predetermined value is detected by the vehicle velocity sensor 11. Thus, the switching unit 34 (relay circuit 35) keeps its activated or ON state to continue supply of the power source $V_P$ to the motor drive unit 13. As a result, the motor drive unit 13 can continue diving of the electric motor 8.

Figure 5:
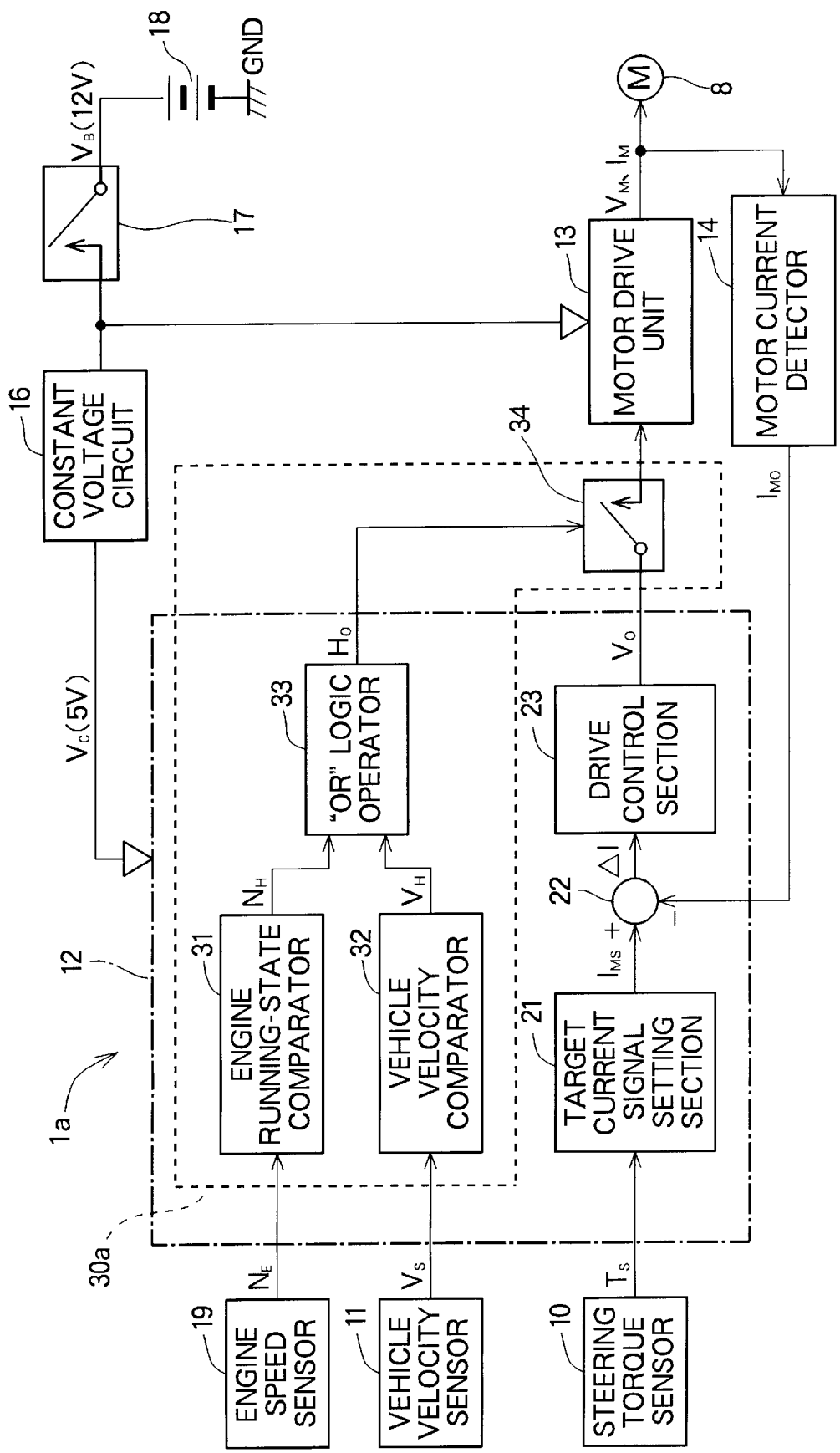
FIG. 5 is a view similar to FIG. 2, but showing a modified form of the electric power steering apparatus.

FIG. 5 shows in block diagram a main portion of an electric power steering apparatus 1a according to a second embodiment of the present invention.

The electric power steering apparatus 1a differs from the one 1 shown FIG. 2 in that a fail-safe means or circuit 30a has a switching unit 34 disposed between the drive control unit 23 and the motor drive unit 13 to selectively interrupt supply of the motor control signal $V_O$ from the drive control section 23 to the motor drive unit 13.

When any one or both of the running-state comparison signal $M_H$ and a vehicle velocity signal $V_H$ have respective values above the predetermined values, a high (H) level logic signal $H_0$ is supplied whereupon the switching unit 34 is switched on or activated to permit the motor control signal $V_O$ to be supplied from the drive control section 23 to the motor drive unit 13 to thereby enable the motor drive unit 13 to start rotation of the electric motor 8.

On the other hand, when the running-state comparison signal $M_H$ and a vehicle velocity signal $V_H$ fall below the respective predetermined values, a low (L) level logic signal $H_0$ is supplied to the switching unit 34 whereupon the switching unit 34 is switched off or deactivated. Thus, supply of the motor control signal $V_O$ to the motor drive unit 13 is interrupted.

Though not shown, the switching unit 34 may be arranged to selectively interrupt supply of the target current signal $I_{MS}$ or the offset signal $\Delta I$, Additionally, when used in conjunction with interruption of the motor control signal $V_O$, the target current signal $I_{MS}$ or the offset signal $\Delta I$, the switching unit 34 may be a simple switching element (such as a transistor, a field-effect transistor or the like) operable by the constant voltage power source $V_C$ (5V) or a software-controlled switching function.

As described above, the electric power steering apparatus includes a fail-safe circuit for, on the basis of an engine running-state signal from an engine running-state sensor, enabling an electric motor to be driven by a motor drive unit. The fail-safe circuit, when the vehicle velocity detected by a vehicle velocity sensor is above a predetermined value, enables the electric motor to be driven by the motor drive unit even if the engine running-state sensor fails to detect the running state of the engine. Thus, even when a failure arises in the engine running-state sensor during movement of the vehicle, the motor can continue application of the steering assist force to the steering system.

The fail-safe circuit includes an engine running-state comparator for comparing the engine running-state signal and a first predetermined value, a vehicle velocity comparator for comparing the vehicle velocity signal and a second predetermined value, an OR logic operator for performing a logic sum of the result of comparison made by the engine running-state comparator and the result of comparison made by the vehicle velocity comparator, and a switching unit for, on the basis a logic signal output from the OR logic operator, enabling the electric motor to be driven by the motor drive unit. Even if the engine running-state signal is below the first predetermined value, the vehicle is regarded as being in the running state when the vehicle velocity signal is above the second predetermined value with the result that operation of the motor is continued to thereby enable the motor to apply the steering assist force to the steering system.

The switching unit includes a relay circuit having a normally-open contact relay. When at least one of the engine running-state signal and the vehicle velocity signal is above the corresponding predetermined value, the normally-open contact relay is activated or switched on to thereby enable the electric motor to be driven by the motor drive unit.

Thus, the electric power steering system applies an appropriate steering assist force to the steering system as long as the vehicle is running even if the running state of the engine is not detected. Accordingly, a good and stable steering feel can always be obtained.

Obviously, various minor changes and modifications of the present invention are possible in the light of the above teaching. It is to be understood that within the scope of the appended claims the present invention may be practiced otherwise than as specifically described.

What is claimed is:

1. An electric power steering apparatus for a vehicle, comprising:
   a vehicle velocity sensor for detecting a velocity of the vehicle and generating a vehicle velocity signal corresponding to the detected vehicle velocity;
   an electric motor for applying a steering assist force to a steering system of the vehicle;
   a control unit for generating a motor control signal on the basis of at least a steering torque applied to the steering system;
   a motor drive unit for driving said electric motor on the basis of said motor control signal;
   an engine running-state sensor for detecting a running state of an engine of a vehicle and generating an engine running-state signal corresponding to the detected running state of the engine; and
   a fail-safe circuit for, on the basis of the engine running-state signal from said engine running-state sensor being above a predetermined value, enabling said electric motor to be driven by said motor drive unit, wherein
   said fail-safe circuit, when a vehicle velocity detected by said vehicle velocity sensor is above a predetermined value, also enables said electric motor to be driven by said motor drive unit even if said engine running-state sensor fails to detect the running state of the engine.

2. An electric power steering apparatus according to claim 1, wherein said fail-safe circuit includes an engine running-state comparator for comparing said engine running-state signal and a first predetermined value, a vehicle velocity comparator for comparing said vehicle velocity signal and a second predetermined value, an OR logic operator for performing a logic sum of the result of comparison made by said engine running-state comparator and the result of comparison made by said vehicle velocity comparator, and a switching unit for, on the basis a logic signal output from said OR logic operator, enabling said electric motor to be driven by said motor drive unit.

3. An electric power steering apparatus according to claim 2, wherein said switching unit includes a relay circuit having a normally-open contact relay.

4. An electric power steering apparatus according to claim 2, further including a battery for supplying a power source to said motor drive unit, and a constant voltage power supply connected with said battery to step down said power source of said battery to a constant voltage power source and supply the constant voltage power source to said control unit, wherein said switching unit is arranged to selectively interrupt supply of the power source from said battery to said motor drive unit.

5. An electric power steering apparatus according to claim 2, further including a battery for supplying a power source to said motor drive unit, and a constant voltage power supply connected with said battery to step down said power source of said battery to a constant voltage power source and supply the constant voltage power source to said control unit, wherein said switching unit is arranged to selectively interrupt supply of the motor control signal from said control unit to said motor drive unit.

* * * * *